(12) United States Patent
Gray, Jr.

(10) Patent No.: US 6,186,126 B1
(45) Date of Patent: Feb. 13, 2001

(54) PHASE CHANGE HEAT ENGINE

(75) Inventor: Charles L. Gray, Jr., Pinckney, MI (US)

(73) Assignee: The United States of America as represented by the Administrator of the United States Environmental Protection Agency, Washington, DC (US)

( * ) Notice: Under 35 U.S.C. 154(b), the term of this patent shall be extended for 0 days.

(21) Appl. No.: 09/356,339

(22) Filed: Jul. 19, 1999

(51) Int. Cl.[7] .................................................... F02B 43/08
(52) U.S. Cl. ........................................... 123/557; 123/558
(58) Field of Search ............................... 123/3, 557, 558, 123/523, 549

(56) References Cited

U.S. PATENT DOCUMENTS

| | | | | |
|---|---|---|---|---|
| 4,044,742 | * | 8/1977 | Linder | 123/557 |
| 4,267,802 | * | 5/1981 | Garretson | 123/523 |
| 4,380,987 | * | 4/1983 | Crain. | 123/558 |
| 4,395,995 | * | 8/1983 | Crain | 123/557 |
| 4,567,857 | * | 2/1986 | Houseman et al. | 123/3 |
| 5,596,973 | * | 1/1997 | Grice | 123/557 |

* cited by examiner

Primary Examiner—Marguerite McMahon
(74) Attorney, Agent, or Firm—Lorusso & Loud

(57) ABSTRACT

An automotive power plant includes an internal combustion engine and a heat exchanger for vaporizing fuel to the internal combustion engine utilizing heat from the combustion exhaust gas. The vaporized fuel may be fed to a combustion cylinder containing the compressed gas produced by a compression stroke. Alternatively, the vaporized gas may be fed to a dedicated expander for extracting work therefrom and then fed to the internal combustion engine.

13 Claims, 2 Drawing Sheets

PHASE CHANGE HEAT ENGINE

BACKGROUND OF THE INVENTION

1. Field of the Invention

The invention relates to an apparatus and method for the utilization of the heat energy normally discarded in the exhaust of internal combustion engines (or from other sources) by converting the heat to mechanical work in a highly efficient manner either using the phase change properties of a working medium or heating a fluid that is pressurized above its critical pressure, thereby increasing the overall efficiency of the engine. The field of application is primarily in internal combustion engines for motor vehicles.

2. Prior Art

The growing utilization of automobiles greatly adds to the atmospheric presence of various pollutants including oxides of nitrogen and greenhouse gases such as carbon dioxide. Accordingly, the need exists for innovations to significantly improve the efficiency of fuel utilization for automotive powertrains.

Internal combustion engines create mechanical work from fuel energy by combusting the fuel over a thermodynamic cycle consisting typically of compression, ignition, expansion, and exhaust. Expansion is the process in which high pressures created by combustion are deployed against a piston, converting part of the released fuel energy to mechanical work. The efficiency of this process is determined in part by the thermodynamic efficiency of the cycle which, in turn, is determined in part by the final pressure and temperature to which the combusted mixture can be expanded while performing work on the moving piston. Generally speaking, the lower the pressure and temperature reached at the end of the expansion stroke, the greater the amount of work that has been extracted.

Conceptually, the work that is performed on the piston can be resolved into two components. One component is the fuel energy released by the combustion process. Another is the compression energy that is returned as the compressed mixture expands again after piston top dead center (TDC) as it naturally would, with or without combustion. When fuel is injected in a liquid state, a phase change (vaporization) occurs which consumes some of the energy present in the compressed mixture that now cannot be reclaimed in the expansion. After combustion has been initiated and expansion of the combustion products begins, the amount of energy in the cylinder available to be delivered via expansion is fixed. At this point all that remains is to expand the high temperature and pressure combustion gases to as near ambient conditions as possible considering the engine design and the properties of the combustion products. Expansion is limited by the fixed maximum volume of the cylinder, since there is only a finite volume available in which combusting gases may expand and still be performing work on the piston. Even if expansion to atmospheric pressure is achieved, the expanded gases are still at high temperature, often exceeding 1000° F. Thus, not only is potential work lost to vaporization of the fuel, but a large amount of potential work is lost as exhaust heat.

A prior art means of utilizing exhaust heat by way of heat transfer to and phase change of a working fluid in a separate system is the well known Rankine Bottoming Cycle. Water is most often used followed by condensation and recycle of the water. Other closed system working fluids may also be used. However, all such systems are costly and have relatively low energy recovery efficiency primarily because much of the energy from the exhaust gas is consumed by the phase change (evaporation) of the working fluid and this energy is mostly lost again in the condenser.

SUMMARY OF INVENTION

The present invention provides a combustion system which includes an expander (bottom-cycle device) and an internal combustion engine (hereinafter, "ICE," also referred to herein as a "topping device") wherein the working fluid for the expander is a suitable fuel for the ICE. The superheated fuel vapor from the expander is combusted in the ICE instead of injecting a liquid fuel, thus eliminating loss of energy to fuel vaporization. The invention also involves a method of operating such a combustion system.

The present invention uses either a vaporizable liquid, or a liquid supplied above its critical pressure, preferably a combustible liquid fuel, rather than a heated compressed gas as in prior art, as the working fluid. Thus, the exhaust heat that powers the bottoming cycle is imparted to a liquid rather than a cooled compressed gas. The high pressure vapor fed to the topping apparatus (ICE) results from a phase change from liquid to gas in a heat exchanger. This eliminates the need for compressor cooling and does not require as much handling of high pressure compressed gas. A liquid working fluid such as methanol, or other working fluid having a more favorable critical point than more traditional phase change liquids such as water (steam), could also be chosen. The working fluid can also be combusted directly in the expander, or in an optional fuel reactor, as an additional means of "hear addition" to the bottoming cycle.

In the preferred embodiments of the present invention the expander is a piston device that imparts exhaust gas heat to liquid fuel, rather than to a compressed gas, resulting in a phase change in the fuel (liquid to gas) that provides a superheated vapor which can be used as working fluid for the expander or as pre-vaporized fuel for an engine or both. The expander may employ combustion of the working fluid as an additional form of heat addition (in addition to the heat that induces the phase change and the superheating of the resulting vapor). This combustion of working fluid may take place instead of or in addition to combustion of the fluid in the ICE.

The present invention includes two different embodiments: (1) a first embodiment wherein the expansion stroke of the ICE serves as the expander and (2) a second embodiment which uses a physically separate expander device. Both embodiments utilize the ICE fuel as the primary phase change working fluid, with an option of adding some additional working fluid such as water to enhance the overall exhaust energy recovered.

As noted above, in the first embodiment the expansion stroke of the ICE also serves to expand the phase change working fluid. The phase change working fluid is introduced at the beginning of the expansion stroke of the ICE, expands and is combusted as expansion continues. Maximum useful mechanical work can be extracted with the least additional hardware and cost by this first embodiment.

In all embodiments, a fuel reactor vessel may be added after superheating to remove additional heat energy from the exhaust gases. For example, methanol fuel can be dissociated into hydrogen and carbon monoxide or further reformed in the presence of water vapor to hydrogen and carbon dioxide transforming exhaust waste heat energy into a higher state of chemical fuel energy for subsequent release during combustion.

The separate expander of the second embodiment may utilize two different modes of operation: (1) two stroke and (2) four stroke. The two stroke separate expander receives the superheated working fluid from the phase-change heat exchanger near TDC and expands the high pressure vapor producing useful work to bottom dead center (BDC). The expander then returns to TDC exhausting the working fluid to the intake of the internal combustion engine for subsequent combustion. The four stroke separate expander first receives intake air as the piston travels from TDC to BDC in the first stroke. The air is then compressed as the piston travels to TDC in the second stroke. The superheated phase change fluid is then added during the initial expansion as the piston travels to BDC in the third stroke producing useful mechanical work. Finally, the air and working fluid mixture is then compressed in the fourth stroke and transported to the intake of the ICE, optionally provided a pressurized charge to boost the ICE.

A representation of the ideal thermodynamic cycle is shown in FIG. 1. The line ab represents the initial intake of ambient air to a cylinder. Line bc represents compression as the piston approaches TDC. Line cd represents mass and heat addition to the expanding volume of the cylinder by the injection, and optionally and preferably the combustion, of a superheated high pressure vapor at constant cylinder pressure. Line db represents continued adiabatic expansion of the contents to ambient conditions, producing the maximum possible work. Line ba represents the exhaust of the expanded contents before the beginning of the next cycle. The area bcd represents the net work performed by the cycle.

The invention effects the cycle shown in FIG. 1 by utilizing a constant pressure superheated phase change (and optionally chemical change) mass addition, optionally and preferably combined with a controlled burn during adiabatic expansion. This controlled burn may be achieved by controlling the injection rate of a vapor such as superheated methanol vapor. The cycle consists of several distinct phases: (1) The pumping of a liquid such as methanol or a methanol-water mixture at high pressure into a heat exchanger heated by exhaust gases or other waste heat source; (2) Addition of heat to the liquid resulting in a phase change and heating to superheated vapor or a higher energy level supercritical fluid (optionally with the addition of heat to the superheated vapor by reaction over an appropriate catalyst to convert the vapor to a higher energy level chemical form); (3) Injection of the vapor into the unswept volume of an expander cylinder near TDC, the cylinder contents being at a lower pressure than the vapor; (4) Initial expansion of the cylinder contents sufficient to maintain relatively constant cylinder pressure as the high-pressure superheated vapor is injected; (5) Optional and preferable ignition of the superheated vapor at such a time or rate that the continued expansion of the cylinder maintains pressure of the combustion products relatively constant; (6) Relatively adiabatic expansion of the cylinder contents against the piston to as close to ambient conditions as possible, producing the maximum amount of work; (7) Exhaust of the expanded contents from the cylinder, optionally conveyed for recirculation, or another appropriate destination to support the topping cycle apparatus. For example, If utilizing the separate expander second embodiment, the expanded mixture can be delivered as fuel to an internal combustion engine, preventing at least the efficiency losses usually associated with vaporization liquid fuel.

Preferably, the apparatus of the invention includes a liquid pump conveying liquid to be vapor-zed, a heat exchanger fed by exhaust gases from an internal combustion engine or other source of waste heat, expander cylinder(s) that expand superheated, and optionally additionally combusted vapors, and injection valve(s) in each cylinder that meter flow of superheated vapor from the heat exchanger to the expander cylinder(s), thus providing control over injection rate and burn rate in such a way as to allow heated mass addition and/or combustion at near constant pressure.

Combined with an internal combustion engine, the present invention provides fuel vaporization capability for the topping cycle (the engine) as well as working fluid for expander dedicated to the bottoming cycle described above.

In order to achieve near constant pressure combustion during the first expansion phase of the expander, combustion may be started just after the beginning of injection of the vapor and the race of injection metered to control the heat release of combustion to a rate that achieves near constant pressure.

Other embodiments can be envisioned that would achieve similar means of control by controlling injection quantities including complete injection of the vapor followed by combustion, spark timing, varying the concentration of recirculated exhaust gases, and the timing of the intake and exhaust valves.

DESCRIPTION OF THE PREFERRED EMBODIMENTS

Figure 1:
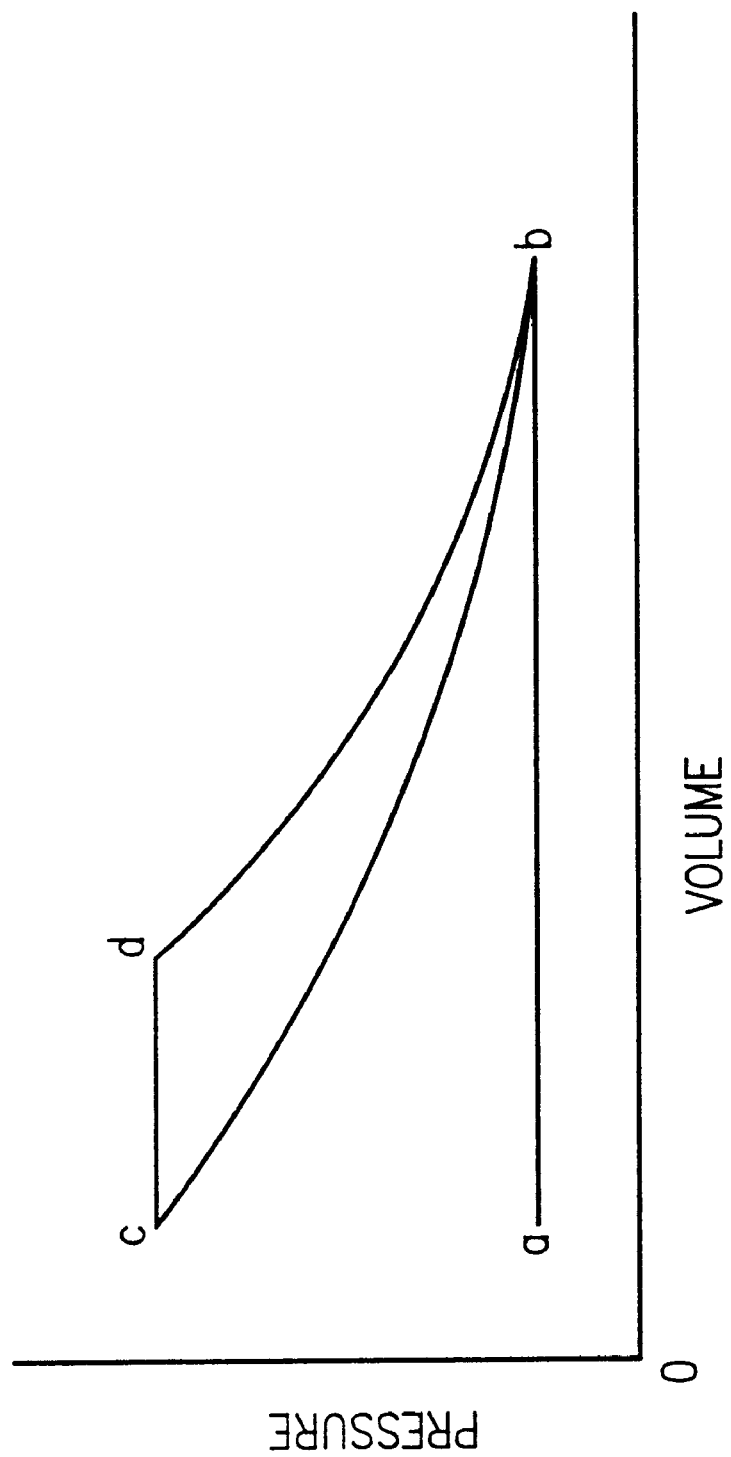
FIG. 1 is a graph showing the ideal thermodynamic cycle consisting of compression, ignition, expansion and exhaust in a piston combustion cylinder.
Figure 2:
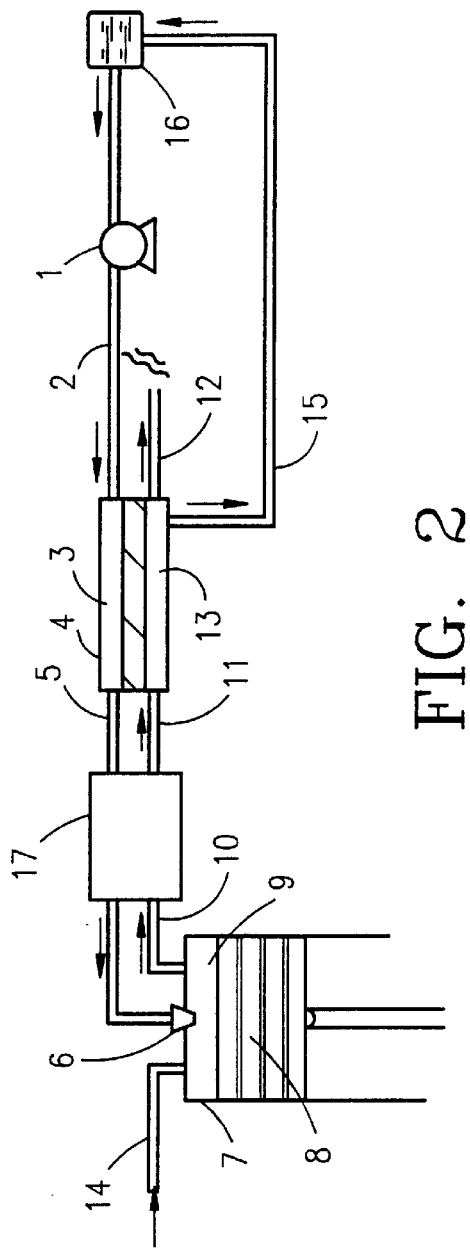
FIG. 2 is a schematic diagram of a first preferred embodiment of the present invention.

In the first preferred embodiment, shown in FIG. 2, hot exhaust gas from an internal combustion engine/expander cylinder 7 is directed through exhaust port 10. Optionally, a fuel reactor 17 may intercept this hot exhaust and absorb some of its heat. The exhaust is further directed to exhaust input side 13 of a heat exchanger 4 from input port 11 and exits at heat exchanger exhaust port 12. A liquid working fluid is conveyed by the high pressure pump 1 from a holding tank 16 to the heat exchanger intake 2. This liquid may optionally be supplemented by the condensate from heat exchanger 4 routed via tube 15. The liquid is preheated, vaporized, and superheated in the vaporization side 3 of the heat exchanger 4, where it absorbs the heat of vaporization and additional heat as superheat at high pressure. The vapor exits the heat exchanger output port 5 at a high temperature and pressure, and travels through the fuel reactor 17. The optional fuel reactor 17 initiates an endothermic process in which the working fluid is dissociated and/or reformed (hereafter often referred to as "reforming") into a higher chemical energy state (for example, methanol to hydrogen arid carbon monoxide) thus further utilizing the heat from the exhaust stream. In this case the dissociated or reformed product becomes the working fluid for the remainder of the cycle. The vapor (or optionally the reformed or dissociated vapor products) travels through a metering valve 6 into the engine/expander cylinder 7 at a point when the piston 8 is at or near top dead center (TDC). At this point the unswept volume 9 of the cylinder contains compressed gas that consists of ambient air previously received through intake valve 14 and the superheated vapor is at a higher pressure than the compressed gas and will flow into the cylinder space when allowed. As the piston 8 recedes from TDC, the high pressure superheated vapor is metered at the valve 6 to flow into the expanding volume at a rate that maintains a practically constant cylinder pressure as expansion proceeds. At an appropriate point, approximately 30 degrees past TDC, a spark is provided for ignition (not shown), or the mixture optionally self ignites, combusting the fuel vapor and creating an additional amount of heat as the cylinder volume continues expanding. Although the pressure may increase as a result of combustion, the elevated pressure stays relatively constant as the volume continues rapid expansion. Eventually the pressure begins to drop off as combustion ceases and volume continues increasing. When the piston 8 reaches bottom dead center (BDC) the gases have been expanded to as close to ambient pressure as possible and the maximum amount of work has been thereby extracted. The work has been produced from the energy in (a) the heat addition that takes place in the heat exchanger 4 in vaporizing the l-quid, (b) further heat addition to the vaporized gas to create a superheated vapor; (c) the optional endothermic process in the fuel reactor 17, and (d) the combustion. In an exhaust stroke, an exhaust port 10 is opened and the piston 8 proceeds toward TDC and exhausts the hot exhaust gases through the fuel reactor 17 and the heat exchanger 4, closing the loop.

Figure 3:
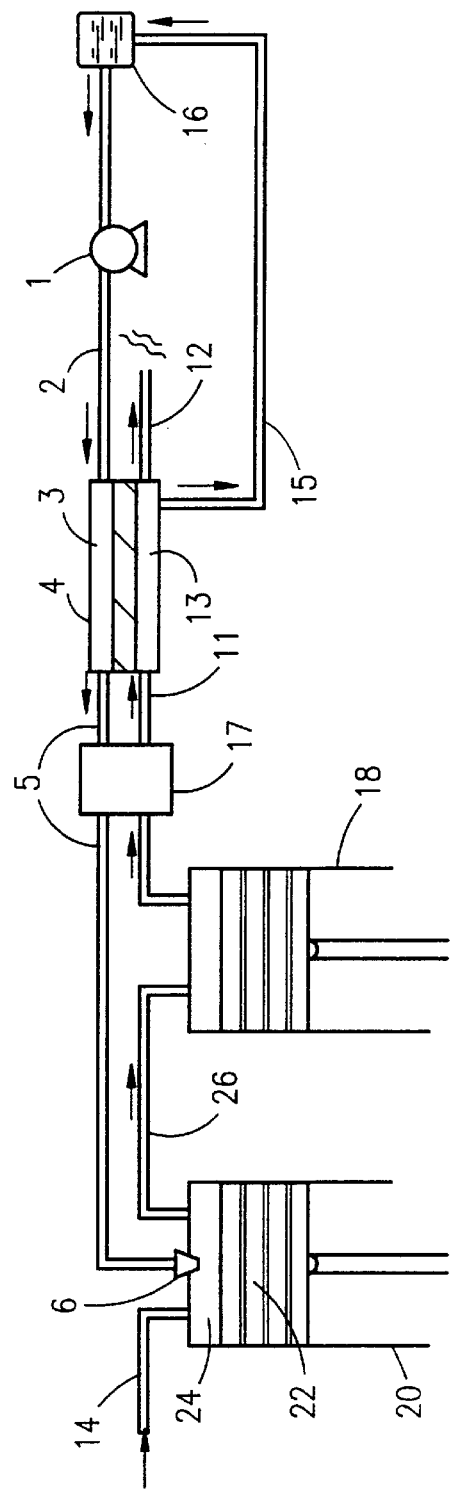
FIG. 3 is a schematic diagram of a second preferred embodiment of the present invention including a dedicated expander.

The second embodiment illustrated in FIG. 3 utilizes a dedicated expander 20. Since the working fluid is a combustible vapor and combustion is not employed in the expander 20, work is extracted in expander 20 by expansion but not by combustion, and the expanded vapor must still be conveyed to the fuel or air intake 26 of internal combustion engine 18 to provide a prevaporized fuel source. The fuel thus provided, being prevaporized by heat that would otherwise be wasted, does not need to absorb in-cylinder heat for vaporization, leading to an improvement in the efficiency of the internal combustion engine 18. This second embodiment utilizes a combustible vapor such as methanol, ethanol, or gasoline (optionally with additional non-combustible phase-change material like water) and has a dedicated expander 20 apparatus in a reciprocal arrangement with the internal combustion engine 18, so that the internal combustion engine 18 is fueled by the working fluid and thus benefits from fuel prevaporization while providing the source of waste heat. As in the previous embodiment, a liquid working fluid is conveyed from tank 16 by the high pressure pump 1 to the heat exchanger intake 2 and the liquid becomes a superheated vapor. The vapor is routed via conveyance means 5, optionally through a fuel reactor 17 which endothermically reacts the working fluid as before. The high pressure vapor or reactor products travel through the metering valve 6 into dedicated expander cylinder 20 which expands the gas to a lower pressure without combustion, performing work but retaining the combustible properties of the expanded gas. The expanded gas is exhausted to internal combustion engine 18 where it is combusted as fuel. Exhaust of the internal combustion cylinder 18 is fed back into the optional fuel reactor 17 and heat exchanger 4, closing the loop.

Optionally, exhaust condensate from the heat exchanger 4 may be conveyed via tube 15 or other conveyance to the liquid pump 1. For instance, a water condensate could provide the water necessary to reform methanol into hydrogen and carbon dioxide.

Thus, the second embodiment unites the expander in a reciprocal arrangement with an internal combustion engine and a combustible working fluid, providing prevaporized fuel for the topping cycle (the engine) 18 as well as working fluid for an expander 20 dedicated to the bottoming cycle.

In this embodiment also, constant pressure combustion may be achieved during the expansion phase of the expander by starting combustion at the beginning of injection of the vapor and metering the rate of injection to control the heat release of combustion. The same end could also be achieved by controlling injection quantities, spark timing, and the timing of the intake and exhaust valves.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. A power plant comprising:

a combustion engine including at least one combustion cylinder and piston reciprocally mounted therein, a fuel inlet for introducing fuel to said one combustion cylinder, an air inlet, separate from said fuel inlet, for introduction of ambient air into said one combustion cylinder, the air being compressed within said one combustion cylinder prior to feeding fuel into said one combustion cylinder, and an exhaust outlet for release of an exhaust gas from said one combustion cylinder;

a fuel tank for holding a liquid fuel;

a heat exchanger for vaporization of fuel from said fuel tank and for superheating the fuel vapor by indirect heat exchange with the exhaust gas, said heat exchanger being connected to said fuel inlet for feeding the superheated fuel vapor into said one combustion cylinder through said fuel inlet; and valve means for feeding the vaporized and superheated fuel to said one combustion cylinder, with said piston near top dead center and containing the compressed air, said fuel undergoing combustion therein to form the exhaust gas.

2. The power plant of claim 1 further comprising a catalytic converter located between said heat exchanger and said one combustion cylinder, said catalytic converter containing a catalyst for catalytically dissociating and/or reforming the fuel vapor introduced into said one combustion cylinder.

3. The power plant of claim 1 additionally comprising a condensate line for conveying condensate from an exhaust gas side of said heat exchanger to said fuel tank.

4. The power plant of claim 2 wherein an exhaust gas line from exhaust outlet passes through said catalytic converter and exits said catalytic converter into said heat exchanger.

5. A vehicle powered by the power plant of claim 1.

6. A power plant comprising:

a combustion engine including at least one combustion cylinder and piston reciprocably mounted therein, a fuel inlet for introducing fuel to said one combustion cylinder and an exhaust outlet for release of an exhaust gas from said one combustion cylinder;

a fuel tank for holding a liquid fuel;

a heat exchanger for vaporization of fuel from said fuel tank by indirect heat exchange with the exhaust gas;

fuel feed means for feeding the vaporized fuel to said one combustion cylinder for combustion therein, forming the exhaust gas; and an expander for receiving vaporized fuel from said heat exchanger at a first pressure, for extracting work from the vaporized fuel, for exhausting the vaporized fuel at a second pressure lower than said first pressure, said expander including an expander cylinder and expander piston reciprocally mounted in said expander cylinder, said expander being located in a fuel line conveying vaporized fuel from said heat exchanger to said one combustion cylinder.

7. The power plant of claim 6 further comprising a catalytic converter located between said heat exchanger and said expander, said catalytic converter containing a catalyst for catalytically dissociating and/or reforming the fuel vapor introduced into said expander.

8. A method of operating a combustion engine including at least one combustion cylinder and a piston reciprocally mounted therein, the combustion cylinder having an air inlet, a fuel inlet separate from said air inlet, and an exhaust outlet, said method comprising:

feeding air into the one combustion cylinder through the air inlet;

compressing the air within the one combustion cylinder;

feeding a liquid fuel to a heat exchanger for indirect heat exchange with the exhaust gas from the exhaust outlet to vaporize the liquid fuel;

superheating the vaporized fuel within the heat exchanger; and feeding the superheated fuel vapor through the fuel inlet into the compressed air within the one combustion cylinder with the piston near top dead center, for combustion of the fuel in the one combustion cylinder and generation of power.

9. A method of operating a combustion engine including at least one combustion cylinder and a piston reciprocably mounted therein, the combustion cylinder having a fuel inlet and an exhaust outlet, said method comprising:

feeding a liquid fuel to a heat exchanger for indirect heat exchange with exhaust gas from the exhaust outlet to vaporize the liquid fuel;

superheating the vaporized fuel within the heat exchanger;

feeding the superheated fuel vapor to an expander for expansion of the superheated fuel vapor therein thereby generating power; and feeding the expanded fuel vapor to the fuel inlet for combustion in the one combustion cylinder and generation of additional power.

10. A method according to claim 9 further comprising catalytically reforming the superheated fuel vapor prior to entering the expander.

11. A method according to claim 8 further comprising catalytically reforming the superheated fuel vapor prior to entry into the fuel inlet.

12. A method according to claim 8 further comprising:

controlling said feeding of the superheated fuel to maintain practically constant cylinder pressure as expansion proceeds.

13. A method according to claim 8 further comprising:

igniting the fuel within the one combustion cylinder just after the beginning of said feeding of the superheated fuel vapor; and controlling the rate of said feeding of the superheated fuel so that combustion proceeds at a rate of heat release that achieves near constant pressures.

* * * * *